(12) United States Patent
Hammock et al.

(10) Patent No.: US 10,528,963 B2
(45) Date of Patent: Jan. 7, 2020

(54) SYSTEMS AND METHODS FOR ISSUING, EVALUATING, AND MONITORING CARD-LINKED OFFERS

(71) Applicant: Capital One Services, LLC, McLean, VA (US)

(72) Inventors: Luke A. Hammock, Washington, DC (US); Janusz Michael Niczyporuk, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 25 days.

(21) Appl. No.: 16/049,461

(22) Filed: Jul. 30, 2018

(65) Prior Publication Data

US 2018/0336583 A1    Nov. 22, 2018

Related U.S. Application Data

(63) Continuation of application No. 13/717,239, filed on Dec. 17, 2012, now Pat. No. 10,074,100.

(51) Int. Cl.
*G06Q 30/02* (2012.01)

(52) U.S. Cl.
CPC ......... *G06Q 30/0211* (2013.01); *G06Q 30/02* (2013.01); *G06Q 30/0207* (2013.01)

(58) Field of Classification Search
CPC ................................................ G06Q 30/0211
USPC ....................................................... 705/14.13
See application file for complete search history.

(56) References Cited

U.S. PATENT DOCUMENTS

| | | | |
|---|---|---|---|
| 2002/0026348 A1 | 2/2002 | Fowler et al. | |
| 2002/0123930 A1* | 9/2002 | Boyd | G06Q 30/02 705/14.13 |
| 2003/0105664 A1* | 6/2003 | Van Luchene | G06Q 10/087 705/14.13 |
| 2010/0106580 A1* | 4/2010 | Etheredge | G06Q 30/02 705/14.17 |

* cited by examiner

*Primary Examiner* — Azam A Ansari
(74) *Attorney, Agent, or Firm* — Finnegan, Henderson, Farabow, Garrett & Dunner LLP

(57) ABSTRACT

Methods and systems are disclosed for issuing, evaluating, and monitoring offers and incentives linked to various consumer financial accounts. Financial service account providers, merchants, card-linked offer providers, and/or service providers may collect transaction information relating to the redemption of card-linked offers. From the data, informative metrics may be determined relating to the offer, its redemption rate, and the consumers who redeemed it. The metrics may be used to evaluate the relative success of the offer, and can trigger revenue sharing processes derived from the offer. In certain aspects, incentive offers may be modified based on the metrics. In further embodiments, the metrics may also be used to determine a metric score that provides further information about the card-linked offer campaign.

20 Claims, 8 Drawing Sheets

SYSTEMS AND METHODS FOR ISSUING, EVALUATING, AND MONITORING CARD-LINKED OFFERS

CROSS-REFERENCE TO RELATED APPLICATIONS

This application is a continuation of U.S. patent application Ser. No. 13/717,239, filed Dec. 17, 2012 (now allowed). The disclosure of the above-identified application is expressly incorporated herein by reference in its entirety.

FIELD

The disclosed embodiments generally relate to financial service account systems and products and, more particularly, to systems, methods, and articles of manufacture for issuing, evaluating, and monitoring offers and incentives linked to financial service accounts, such as payment accounts.

BACKGROUND

Credit card accounts and other similar financial service accounts are ubiquitous in modern commerce. Whether they use electronic payment methods such as debit cards, credit cards, prepaid cards, or stored value cards, or use a service provider with an underlying link to a payment account, such as PayPal®, consumers use financial service accounts for their convenience at a point of sale and for the ease of consolidating payback options. Many consumers find that paying one single entity at the end of each billing cycle (e.g., a financial service account provider, such as a bank) is much easier than paying numerous creditors by check.

As financial and information technology industries have evolved, so have the options that financial service account providers and merchants offer consumers. Consumers typically carry many financial cards linked to different financial accounts, such as traditional credit cards, debit or check cards linked directly to a checking account, and loyalty cards issued by merchants to recognize and reward frequent consumers.

To persuade consumers to use a particular financial service account, companies may offer incentives to customers to persuade them to purchase more items, try a new item, or visit a retailer more frequently. Coupons, rewards points, and advertised sales are all common methods of incentivizing consumer behavior. In recent years, some advertisers, merchants, and financial account providers have begun to incentivize the behavior of consumers via a card-linked offer. Card-linked offers, which comprise a wide variety of discounts or offers tied to financial service accounts, are generated by merchants, financial service account providers, and advertisers, and are placed directly onto payment cards linked to financial service accounts held by consumers. For example, a customer purchasing an item may find at checkout that their purchase is automatically discounted by their financial service account provider based on the coupon, discount, or promotion or is entitled to a discount on a future purchase.

While helpful for consumers, conventional card-linked offer systems and processes lack uniform mechanisms for evaluating and reporting the relative success of a particular offer campaign. Whereas standardized reporting metrics such as Gross Ratings Points (GRPs), Cost per thousand impressions, and Cost per Click (CPC), are routinely used to quantify the baseline cost and success of advertising campaigns in media and online, no such metrics currently exist for the card-linked offer industry. This deficiency hampers the growth of the financial services industry because card-linked offer card-linked offers because providers cannot be substantively compared to one another. Financial service account providers and merchants may have difficulties in selecting and evaluating these providers, and the positive impact to an advertiser cannot be effectively compared to other forms of marketing and advertising.

SUMMARY

Systems and methods consistent with the present disclosure enable a computing system to receive transaction information relating to a purchase transaction associated with a user and a merchant, the transaction involving the use of a financial service account associated with the user and provided by a financial service provider. Additionally, the computing system may determine an incentive offer metric based on the transaction information, with the incentive offer metric reflecting a performance of the incentive offer relative to predetermined criteria. Further, the computing system may provide the incentive offer metric to a remote device.

In another embodiment, a computing system is disclosed that is configured to receive an incentive offer metric from a remote device, and then store the incentive offer metric data. Additionally, the computing system may determine whether the incentive offer metric meets predetermined criteria for assessing a performance of the incentive offer. Further, the computing system may generate report data reflecting an assessment of the performance of the incentive offer, and provide the report data to a remote device.

In yet another embodiment, a method is disclosed for providing card-linked incentive offer metrics. The method includes receiving, by a processor, transaction information relating to a purchase transaction associated with a user and a merchant, the transaction involving the use of a financial service account associated with the user and provided by a financial service provider. Additionally, the method includes determining, by the processor, an incentive offer metric based on the transaction information, the incentive offer metric reflecting a performance of the incentive offer relative to predetermined criteria. Further, the method includes providing the incentive offer metric to a remote device.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed. For example, the ratios and metrics relating to the disclosed embodiments may be implemented system environments outside of the exemplary system environments disclosed herein. Furthermore, one of ordinary skill in the art may integrate the disclosed metrics into other industry standards in the financial service and advertising industries. One of ordinary skill in the art may further use the disclosed metrics to assess the performance of various entities involved with the design and implication of card-linked offers.

BRIEF DESCRIPTION OF THE DRAWINGS

The accompanying drawings, which are incorporated in and constitute a part of this specification, illustrate various embodiments and aspects of the disclosed embodiments and, together with the description, serve to explain the principles of the disclosed embodiments. In the drawings.

DETAILED DESCRIPTION

Reference will now be made in detail to the disclosed exemplary embodiments, examples of which are illustrated in the accompanying drawings. Wherever possible, the same reference numbers will be used throughout the drawings to refer to the same or like parts.

Methods, systems, and articles of manufacture relating to the disclosed embodiments provide features for generating, providing, evaluating, and/or monitoring offers and incentives linked to financial service accounts. A financial service account may be, for example, a credit card account, a debit card account, a consumer loyalty card account, a payment account, or any type of financial related account provided by an entity (e.g., a financial service provider, merchant, etc.) that may be used in financial transactions, such as purchasing goods or services, paying bills, and the like. The financial service accounts described in connection with the disclosed embodiments are exemplary and are not intended to be limiting.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. The processes disclosed herein may be implemented by a suitable combination of hardware, software, and/or firmware. For example, the disclosed embodiments may implement general purpose machines that may be configured to execute software programs that perform processes consistent with the disclosed embodiments. Alternatively, the disclosed embodiments may implement a specialized apparatus or system configured to execute software programs that perform processes consistent with the disclosed embodiments.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as for example machine code (e.g., such as that produced by a compiler) and/or high level code that can be executed by a processor using an interpreter.

Figure 1:
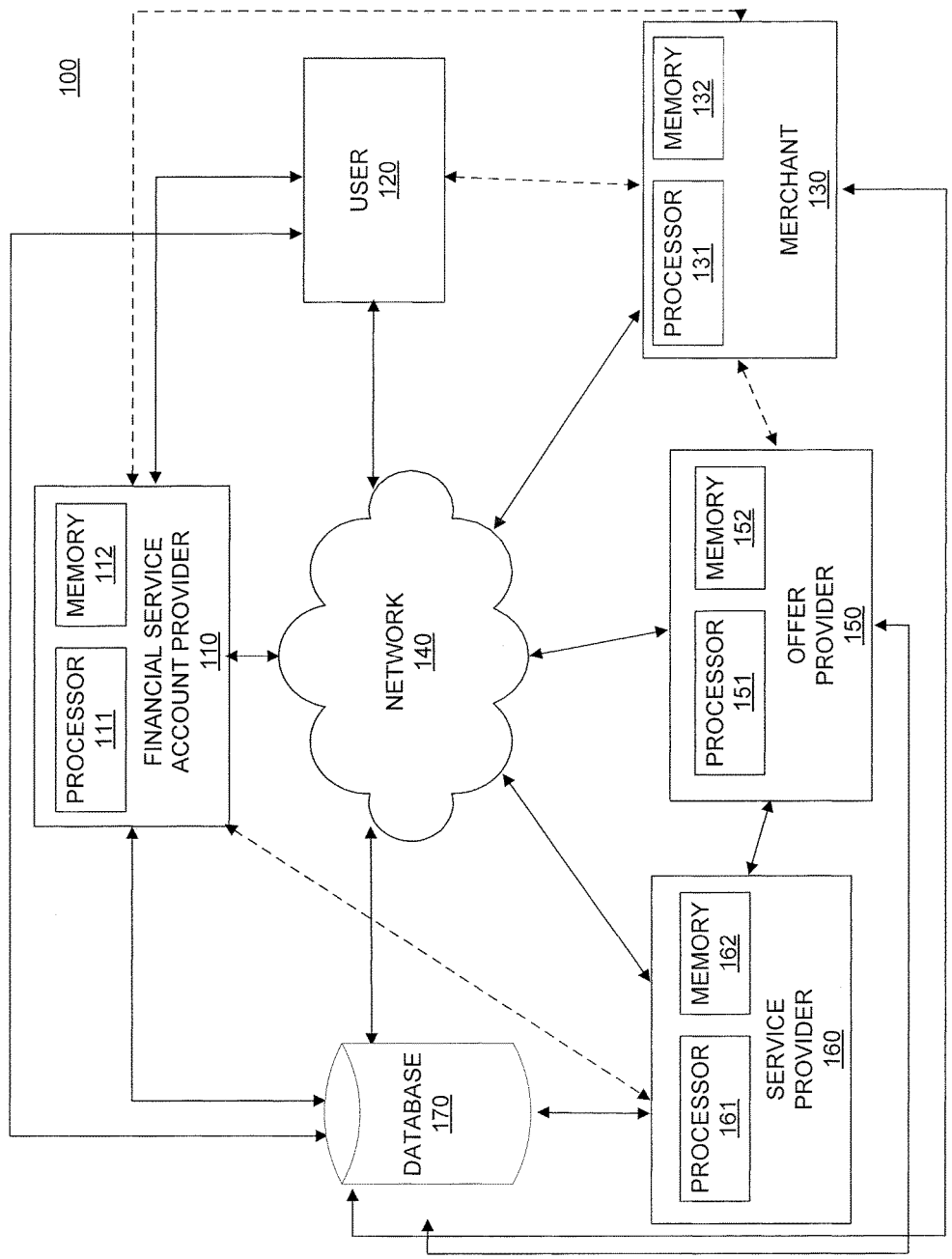
FIG. 1 illustrates an exemplary system environment consistent with certain disclosed embodiments.

FIG. 1 illustrates an exemplary system environment 100 consistent with disclosed embodiments. In one aspect, system environment 100 may include a financial service account provider 110, user 120, merchant 130, network 140, offer provider 150, service provider 160, and database 170.

Financial service account provider 110 may be one or more entities that configure, offer, provide, and/or manage financial service accounts, such as credit card accounts, debit card accounts, checking or savings accounts, consumer loyalty card accounts, stored value accounts, payment accounts, and/or prepaid cards. Financial service account provider 110 may additionally represent a provider that links to underlying financial service accounts or payment accounts (e.g., Paypal®, etc.). In certain aspects, financial service account provider 110 may provide one or more financial service accounts to one or more consumers, such as user 120. In certain embodiments, financial service account provider 110 may receive and process payments from consumers, such as user 120, relating to provided financial service accounts.

Financial service account provider 110 may include one or more components that perform financial service account processes consistent with the disclosed embodiments. For example, financial service account provider 110 may include one or more computers (e.g., servers, database systems, etc.) that are configured to execute software instructions programmed to perform aspects of the disclosed embodiments and known financial service account processes, such as generating financial service accounts, maintaining such accounts, processing information relating to such accounts, etc. One of ordinary skill in the art would recognize that financial service account provider 110 may include components and infrastructure that enables it to perform operations, processes, and services consistent with financial service account providers, such as banking operations, credit card operations, etc.

In one embodiment, financial service account provider 110 may include one or more processors 111 and one or more memory devices 112, as shown in exemplary form in FIG. 1. Processor 111 may be one or more known processing devices, such as a microprocessor from the Pentium™ family manufactured by Intel™ or the Turion™ family manufactured by AMD™. Processor 111 may include a single core or multiple core processor system that provides the ability to perform parallel processes simultaneously. For example, processor 111 may be a single core processor that is configured with virtual processing technologies known to those skilled in the art. In certain embodiments, processor 111 may use logical processors to simultaneously execute and control multiple processes. Processor 111 may implement virtual machine technologies, or other similar known technologies to provide the ability to execute, control, run, manipulate, store, etc. multiple software processes, applications, programs, etc. In another embodiment, processor 111 may include a multiple-core processor arrangement (e.g., dual or quad core) that is configured to provide parallel processing functionalities to enable computer components of financial service account provider 110 to execute multiple processes simultaneously. One of ordinary skill in the art would understand that other types of processor arrangements could be implemented that provide for the capabilities disclosed herein. Moreover, processor 111 may represent one or more servers or other computing devices that are associated with financial service account provider 110. For instance, processor 111 may represent a distributed network of processors that are configured to operate together over a local or wide area network. Alternatively, processor 111 may be a processing device that is configured to execute software instructions that receive and send information, instructions, etc. to/from other processing devices associated with financial service provider 110 or other components of system environment 100. In certain aspects, processor 111 may be configured to execute software instructions stored in memory 112 to perform one or more processes consistent with disclosed embodiments to provide, manage, monitor, and assess a financial service account and/or a card-linked offer to a customer.

Memory 112 may be one or more memory devices that includes software instructions that are executed by processor 111, such as one or more applications, network communication processes, operating system software, software instructions relating to the disclosed embodiments, and any other type of application or software known to be executable by processing devices. Memory 112 may be a volatile or non-volatile, magnetic, semiconductor, tape, optical, removable, nonremovable, or other type of storage device or tangible computer-readable medium. Memory 112 may be two or more memory devices distributed over a local or wide area network, or may be a single memory device. In certain embodiments, memory 112 may include database systems, such as database storage devices, one or more database processing devices configured to receive instructions to access, process, and send information stored in the storage devices.

In some embodiments, financial service account provider 110 may also include one or more components (not shown) that provide communications with other components of system environment 100, such as through network 140, or any other suitable communications infrastructure.

User 120 may be one or more customers or prospective customers of financial service account provider 110 and/or merchant 130. User 120 may be an individual, a group of individuals, a business entity, or a group of business entities. Although the description of certain embodiments may refer to an "individual," the description applies to a group of users or a business entity. In certain aspects, user 120 may include one or more computing devices that is used by user 120 to perform computing activities, such as a laptop, desktop computer, tablet device, smart phone, or other handheld or stand-alone devices configured to execute software instructions and communicate with network 140 or other components of system environment 100. For example, user 120 may use a handheld device to communicate with financial service account provider 110 or merchant 130 over the Internet.

Merchant 130 may represent one or more entities that provide goods and/or services that may be purchased by customers, such as user 120. In certain embodiments, merchant 130 may represent one or more vendors that directly sell its goods or the goods of others to customers, for example, at a brick and mortar store location or over network 140 (i.e. telephonically or "online" via the Internet). Merchant 130 may additionally represent a product manufacturer that does not directly sell its own goods. Merchant 130 may further represent entities that serve as marketplaces or as marketing affiliates for other merchants or product manufacturers.

For example, merchant 130 may represent a vendor that offers goods or services user 120 purchases using one or more of the financial service accounts held by the user and provided by financial service account provider 110 or merchant 130. User 120 may purchase goods and/or services from merchant 130 directly over normal channels of trade (i.e., a point of sale (POS) purchase), or they may purchase them online from merchant 130 over network 140. Merchant 130 may possess the capability to authenticate purchase transactions made via the financial service account in various ways, including but not limited to the swiping of a card, biometric authentication, scanning a barcode or other code, Near Field Communication (NFC) technology, or Radio Frequency Identification (RFID) technology.

Merchant 130 may include one or more components that perform processes consistent with the disclosed embodiments. For example, merchant 130 may include one or more computers (e.g., servers, database systems, etc.) that are configured to execute software instructions programmed to perform aspects of the disclosed embodiments and known financial service account processes, such as generating financial service accounts, maintaining such accounts, processing information relating to such accounts, processing and handling transactions relating to sales of goods and/or services, etc. One of ordinary skill in the art would recognize that merchant 130 may include components and infrastructure that enable it to perform operations, processes, and services consistent with merchants, such as providing websites that offer for sale goods and/or services, processing sales transactions of purchases made over the Internet or at POS locations, and communicating with financial service account provider 110 or other components relating to the transactions.

In one embodiment, merchant 130 may include one or more processors 131 and one or more memory devices 132, as shown in exemplary form in FIG. 1. Processor 131 may be one or more known processing devices, such as a microprocessor from the Pentium™ family manufactured by Intel™ or the Turion™ family manufactured by AMD™. Processor 131 may include a single core or multiple core processor system that provides the ability to perform parallel processes simultaneously. For example, processor 131 may be a single core processor that is configured with virtual processing technologies known to those skilled in the art. In certain embodiments, processor 131 may use logical processors to simultaneously execute and control multiple processes. Processor 131 may implement virtual machine technologies, or other similar known technologies to provide the ability to execute, control, run, manipulate, store, etc. multiple software processes, applications, programs, etc. In another embodiment, processor 131 may include a multiple-core processor arrangement (e.g., dual or quad core) that is configured to provide parallel processing functionalities to enable computer components of merchant 130 to execute multiple processes simultaneously. One of ordinary skill in the art would understand that other types of processor arrangements could be implemented that provide for the capabilities disclosed herein. Moreover, processor 131 may represent one or more servers or other computing devices that are associated with merchant 130. For instance, processor 131 may represent a distributed network of processors that are configured to operate together over a local or wide area network. Alternatively, processor 131 may be a processing device that is configured to execute software instructions that receive and send information, instructions, etc. to/from other processing devices associated with merchant 130 or other components of system environment 100. In certain aspects, processor 131 may be configured to execute software instructions stored in memory 132 to perform one or more processes consistent with disclosed embodiments to provide, manage, monitor, and assess a financial service account and/or a card-linked offer to a customer.

Memory 132 may be one or more memory devices that includes software instructions that are executed by processor 131, such as one or more applications, network communication processes, operating system software, software instructions relating to the disclosed embodiments, and any other type of application or software known to be executable by processing devices. Memory 132 may be a volatile or non-volatile, magnetic, semiconductor, tape, optical, removable, nonremovable, or other type of storage device or tangible computer-readable medium. Memory 132 may be two or more memory devices distributed over a local or wide area network, or may be a single memory device. In certain embodiments, memory 132 may include database systems, such as database storage devices, one or more database processing devices configured to receive instructions to access, process, and send information stored in the storage devices.

Thus, in certain embodiments, merchant 130 may also include one or more components (not shown) that communicate with components of system environment 100, such as through network 140, database 170, or any other suitable communications infrastructure.

Network 140 may be any type of network that facilitates communications and data transfer between components of system environment 100, such as, for example, financial service account provider 110, user 120, merchant 130, offer provider 150, service provider 160, and database 170. Network 140 may be a Local Area Network (LAN), a Wide Area Network (WAN), such as the Internet, and may be a single network or a combination of networks. Further, network 140 may reflect a single type of network or a combination of different types of networks, such as the Internet and public exchange networks for wireline and/or wireless communications. Network 140 may utilize cloud computing technologies that are familiar in the marketplace. Moreover, any part of network 140 may be implemented through traditional infrastructures or channels of trade, to permit operations associated with financial accounts that are performed manually or in-person by the various entities illustrated in FIG. 1. One skilled in the art would recognize that network 140 is not limited to the above examples and that system 100 may implement any type of network that allows the entities (and others not shown) included in FIG. 1 to exchange data and information.

Offer provider 150 may represent one or more entities that may design, transmit, present, and monitor one or more incentive offers for consumers, such as user 120. Offer provider 150 may be a merchant, or an advertising or marketing entity hired by merchant 130 to enhance the business of the merchant. Offer provider 150 may be a financial institution, such as financial service account provider 110 or any other company that acts as a financial service account provider.

Offer provider 150 may include one or more components that perform processes consistent with the disclosed embodiments. For example, offer provider 150 may include one or more computers (e.g., servers, database systems, etc.) that are configured to execute software instructions programmed to perform aspects of the disclosed embodiments and known incentive offer processes, such as generating incentive offers, maintaining such offers, processing information relating to such offers, processing and handling transactions relating to offers, etc. One of ordinary skill in the art would recognize that offer provider 150 may include components and infrastructure that enable it to perform operations, processes, and services consistent with entities that provide incentive offers. Offer provider 150 may include components that enable it to provide incentive offers to user 120 through merchant 130 (e.g., at a POS location), or online, such as a web site that user 120 may visit when purchasing or browsing to purchase items from merchant 130.

In one embodiment, offer provider 150 may include one or more processors 151 and one or more memory devices 152, as shown in exemplary form in FIG. 1. Processor 151 may be one or more known processing devices, such as a microprocessor from the Pentium™ family manufactured by Intel™ or the Turion™ family manufactured by AMD™. Processor 151 may include a single core or multiple core processor system that provides the ability to perform parallel processes simultaneously. For example, processor 151 may be a single core processor that is configured with virtual processing technologies known to those skilled in the art. In certain embodiments, processor 151 may use logical processors to simultaneously execute and control multiple processes. Processor 151 may implement virtual machine technologies, or other similar known technologies to provide the ability to execute, control, run, manipulate, store, etc. multiple software processes, applications, programs, etc. In another embodiment, processor 151 may include a multiple-core processor arrangement (e.g., dual or quad core) that is configured to provide parallel processing functionalities to enable computer components of offer provider 150 to execute multiple processes simultaneously. One of ordinary skill in the art would understand that other types of processor arrangements could be implemented that provide for the capabilities disclosed herein. Moreover, processor 151 may represent one or more servers or other computing devices that are associated with offer provider 150. For instance, processor 151 may represent a distributed network of processors that are configured to operate together over a local or wide area network. Alternatively, processor 151 may be a processing device that is configured to execute software instructions that receive and send information, instructions, etc. to/from other processing devices associated with offer provider 150 or other components of system environment 100. In certain aspects, processor 151 may be configured to execute software instructions stored in memory 152 to perform one or more processes consistent with disclosed embodiments to provide, manage, monitor, and assess a financial service account and/or a card-linked offer to a customer.

Memory 152 may be one or more memory devices that includes software instructions that are executed by processor 151, such as one or more applications, network communication processes, operating system software, software instructions relating to the disclosed embodiments, and any other type of application or software known to be executable by processing devices. Memory 152 may be a volatile or non-volatile, magnetic, semiconductor, tape, optical, removable, nonremovable, or other type of storage device or tangible computer-readable medium. Memory 152 may be two or more memory devices distributed over a local or wide area network, or may be a single memory device. In certain embodiments, memory 152 may include database systems, such as database storage devices, one or more database processing devices configured to receive instructions to access, process, and send information stored in the storage devices.

In certain embodiments, offer provider 150 may include processing components that provide and process communications between components of system environment 100 through network 140, database 170, or any other suitable communications infrastructure.

In one aspect, offer provider 150 may provide incentive offers that relate to discounts on goods or services that have been or may be purchased by user 120. For example, incentive offers may include offers for a free item contained or not contained within the user 120's current purchase of items from merchant 130. Incentive offers may also include a discount for an item not contained in a list of items that user 120 may have purchased from merchant 130. Incentive offers may also include a credit that may be applied to the financial service account of user 120 provided by financial service account provider 110. Incentive offers may also be a cash back offer for a determined amount of funds that may be redeemed as a check.

Service provider 160 may represent one or more entities that may design, transmit, present, monitor, and process an offer or incentive for a consumer such as user 120. In one aspect, service provider 160 may be an independent entity from offer provider 150, or alternatively, offer provider 150 and service provider 160 may be associated with the same entity.

Service provider 160 may include one or more components that perform processes consistent with the disclosed embodiments. For example, service provider 160 may include one or more computer devices (e.g., servers, database systems, etc.) that are configured to execute software instructions programmed to perform aspects of the disclosed embodiments. For instance, service provider 160 may include a computer system that performs one or more processes consistent with disclosed embodiments. The computer system may include one or more processing devices, memory devices, interface devices, data, and executable software that allows service provider 160 to identify prospective customers, such as user 120, prospective retailers, such as merchant 130, and prospective card programs linked to financial accounts, such as those offered by financial account provider 110. The computer system or computer device(s) may be configured to communicate funds back and forth between service provider 160 and other components of environment 100, or may be configured as an intermediary that communicates data and funds between two or more components of environment 100.

In one embodiment, service provider 160 may include one or more processors 161 and one or more memory devices 162, as shown in exemplary form in FIG. 1. Processor 161 may be one or more known processing devices, such as a microprocessor from the Pentium™ family manufactured by Intel™ or the Turion™ family manufactured by AMD™. Processor 161 may include a single core or multiple core processor system that provides the ability to perform parallel processes simultaneously. For example, processor 161 may be a single core processor that is configured with virtual processing technologies known to those skilled in the art. In certain embodiments, processor 161 may use logical processors to simultaneously execute and control multiple processes. Processor 161 may implement virtual machine technologies, or other similar known technologies to provide the ability to execute, control, run, manipulate, store, etc. multiple software processes, applications, programs, etc. In another embodiment, processor 161 may include a multiple-core processor arrangement (e.g., dual or quad core) that is configured to provide parallel processing functionalities to enable computer components of service provider 160 to execute multiple processes simultaneously. One of ordinary skill in the art would understand that other types of processor arrangements could be implemented that provide for the capabilities disclosed herein. Moreover, processor 161 may represent one or more servers or other computing devices that are associated with financial service account provider 110. For instance, processor 161 may represent a distributed network of processors that are configured to operate together over a local or wide area network. Alternatively, processor 161 may be a processing device that is configured to execute software instructions that receive and send information, instructions, etc. to/from other processing devices associated with service provider 160 or other components of system environment 100. In certain aspects, processor 161 may be configured to execute software instructions stored in memory 162 to perform one or more processes consistent with disclosed embodiments to provide, manage, monitor, and assess a financial service account and/or a card-linked offer to a customer.

Memory 162 may be one or more memory devices that include software instructions that are executed by processor 161, such as one or more applications, network communication processes, operating system software, software instructions relating to the disclosed embodiments, and any other type of application or software known to be executable by processing devices. Memory 162 may be a volatile or non-volatile, magnetic, semiconductor, tape, optical, removable, nonremovable, or other type of storage device or tangible computer-readable medium. Memory 162 may be two or more memory devices distributed over a local or wide area network, or may be a single memory device. In certain embodiments, memory 162 may include database systems, such as database storage devices, one or more database processing devices configured to receive instructions to access, process, and send information stored in the storage devices.

In some embodiments, service provider 160 may include one or more processing components that enable and process communications with components of system environment 100 through network 140, database 170, or any other suitable communications infrastructure.

In certain embodiments, service provider 160 may be associated with financial service account provider 110. For example, service provider 160 may be an entity of financial service account provider that performs (via computing devices) service provider functions consistent with the disclosed embodiments. In other embodiments, financial service account provider 110 may be configured to execute and perform the features and functionalities of service provider 160 consistent with the disclosed embodiments. For example, in one embodiment, system environment 100 may not include service provider 160 as a component of environment 100, but instead, the features and functionalities of service provider 160 as disclosed herein may be performed by financial service account provider 110. In such embodiments, financial service account provider 110 may include software instructions stored in memory 112 that, when executed by processor 111, perform service provider 160 functionalities as disclosed herein.

Database 170 may represent one or more storage devices and/or systems that maintain data used by elements of system environment 100. Database 170 may include one or more processing components (e.g., storage controller, processor, etc.) that perform various data transfer and storage operations consistent with certain features consistent with the disclosed embodiments. In certain embodiments, database 170 may be associated with financial service account provider 110, and may be implemented as a component of provider 110 either remotely or locally. In other embodiments, database 170 may be related to other entities, such as service provider 160 or merchant 150. In other aspects, database 170 may be related to an independent entity that provides database services for one or more components of system environment 100 consistent with the disclosed embodiments.

In one embodiment, database 170 may store offer redemption data that may be submitted from any one of financial account provider 110, user 120, merchant 130, offer provider 150, or service provider 160. In another embodiment, database 170 stores one or more offer redemption metrics that may be calculated and submitted from any one of financial account provider 110, merchant 130, offer provider 150, or service provider 160. Further, database 170 may store revenue sharing data that may be calculated and submitted from any one of financial account provider 110, merchant 130, offer provider 150, or service provider 160. These and other components of system environment 100 may be configured to interface with database 170 via network 140 or other communication mechanisms.

Although FIG. 1 describes a certain number of entities and processing/computing components within system environment 100, any number or combination of components may be implemented without departing from the scope of the disclosed embodiments. For example, different merchants 130 may serve one or more users 120 through network 140 or standard channels of trade, such as face-to-face purchase transactions. Additionally, financial account provider 110, merchant 130, offer provider 150, and service provider 160 are not mutually exclusive. For example, in one embodiment, financial service account provider 110 and merchant 130 may be the same entity. In another embodiment, financial service account provider 110 and offer provider 150 may be the same entity. In another embodiment, merchant 130 and offer provider 150 may be the same entity. In another embodiment, financial account provider 110, merchant 130, and offer provider 150 may all be the same entity. In another embodiment, financial service account provider 110 and service provider 160 may be the same entity. In another embodiment, merchant 130 and service provider 160 may be the same entity. In another embodiment, financial account provider 110, merchant 130, and service provider 160 may all be the same entity. In another embodiment, offer provider 150 and service provider 160 may be the same entity. In another embodiment, financial account provider 110, offer provider 150, and service provider 160 may all be the same entity. In another embodiment, merchant 130, offer provider 150, and service provider 160 may all be the same entity. In another embodiment, financial account provider 110, merchant 130, offer provider 150, and service provider 160 may all be the same entity. One skilled in the art will appreciate that the entities as described are not limited to their discrete descriptions above. Further, where different components of system environment 100 are combined (e.g., financial service account provider 110 and merchant 130, etc.), the computing and processing devices and software executed by these components may be integrated into a local or distributed system. For example, memory 112 may be configured to store software instructions that when executed by processor 111 perform one or more functions relating to the combined components in a manner consistent with the disclosed embodiments.

Figure 2:
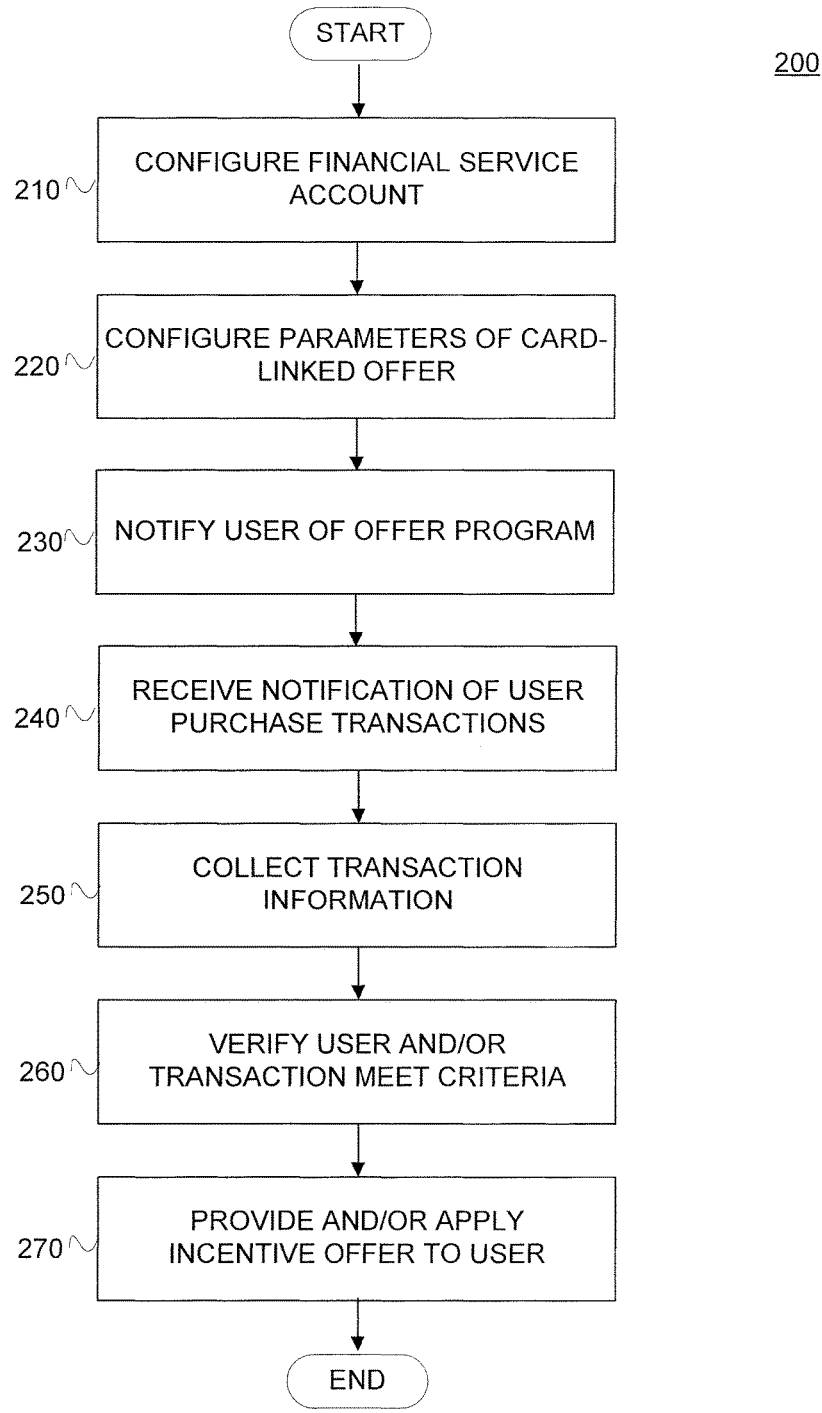
FIG. 2 is a flowchart of an exemplary financial service account offer process consistent with certain disclosed embodiments.

FIG. 2 illustrates a flowchart of an exemplary financial service account card-linked offer process consistent with disclosed embodiments. The card-linked offer process is described in connection with a customer, who may be user 120 of exemplary system environment 100. In one aspect, user 120 may hold a financial service account provided by a financial service account provider 110. In one aspect, the financial account may be a customer loyalty or rewards account associated with a financial account provided by a retailer, such as merchant 130, service provider 160, and/or offer provider 150 of exemplary system environment 100.

In one aspect, an account provider (e.g., financial service account provider 110 or merchant 130) may configure a financial account for user 120 (Step 210). Configuring the account may include setting up a new account, or it may entail altering account parameters for an existing account. FIG. 2 will be described in connection with financial service account provider 110 as the account provider, but it is understood that other components may provide a card-linked offer to user 120, such as merchant 130.

In one embodiment, financial service account provider 110 (or other entities of system environment 100) may configure one or more parameters associated with a card-linked offer for user 120 (Step 220). For example, any or all of financial service account provider 110, merchant 130, offer provider 150, or service provider 160 may generate and provide one or more offer parameters that are associated with a card-linked offer for user 120. An offer parameter may reflect a discount on a certain good or service, a general discount at a given merchant 130, a time constraint for redemption of the offer, or other types of offer parameters known in the art. An offer parameter may be based on personal characteristics of user 120, prior consumer habits of user 120, or other attributes associated with user 120. For example, financial service account provider 110 may provide a card-linked offer to user 120 that reflects a discount on a certain mid-level brand of paper towels based on purchase habits of user 120 (e.g., user 120 having consistently purchased a lower-level brand of paper towels). This consumer data may be monitored and tracked by merchant 130, financial service account provider 110, service provider 160, and/or offer provider 150 based on transaction information relating to purchases made by user 120. The disclosed embodiments may implement known mechanisms and processes used for tracking consumer purchases. In one aspect, the consumer data can be compiled and shared throughout exemplary system environment 100 through network 140 and/or database 170.

In one embodiment, offer provider 150 (or the entity that prepares to present the offer, such as financial server provider 110) may generate and provide a notification to user 120 to request optional enrollment in a card-linked offer program (Step 230). In certain aspects, the offer request may be provided as part of an advertising campaign, brand rollout, or other targeted strategy. In certain aspects, offer provider 150 may provide the offer to user 120 without a request from user 120. Offer provider 150 may provide the request by various means of communication, such as through postal mail, telephonic means, by SMS messaging, via a mobile application, through print and broadcast media outlets, including but not limited to newspapers, television, or radio, or through network 140 by means of directed electronic mail messages, advertising banners on Internet-based websites, or "pop-up" advertisements.

User 120 may accept the offer to take part of the card-linked program provided by offer provider 150 and then at some point perform one or more purchase transactions using the financial account from financial service account provider 110 linked to the offer or offers (Step 240). These transactions may occur in various locations in various ways, such as at a point of sale in a brick-and-mortar location of merchant 130, or through network 140 via an Internet Web site associated with merchant 130. For example, Internet transactions may occur on Internet sites owned and operated by merchant 130, or they may occur at intermediate shopping sites such as eBay®, Amazon.com®, or Craigslist®, or on social media such as Facebook®, Pinterest®, or Twitter®.

Service provider 160 may acquire, collect, and store information about the purchase transaction (Step 250). In one aspect, merchant 130 may provide the transaction information to service provider 160 in response to a request by service provider 160 or automatically based on periodic reporting mechanisms. The transaction information may include data about user 120, such as demographic information, value of transaction, types of goods purchased, consumer history with merchant 130 or other merchants, etc. The transaction information may also include information or data about the consumer, merchant, transaction, or financial account. In one aspect, merchant 130 may provide the transaction information to database 170 for storage and access by service provider 160, or alternatively, directly transmit the information to financial service account provider 110, offer provider 150 and/or service provider 160 via network 140. The processes and mechanisms used for collecting transaction information are exemplary and the disclosed embodiments are not limited to the above examples. Financial account provider 110, merchant 130, offer provider 150, service provider 160, network 140, and database 170 may each be configured to collect, store, and monitor transaction information using other types of technologies, methodologies, and processes familiar to those skilled in the art.

Service provider 160 may verify whether the user 120 and/or the purchase transaction completed in Step 230 meets predetermined criteria for a card-linked offer (Step 260). In one aspect, service provider 160 may verify user 120 and/or the purchase transaction based on the transaction information provided by merchant 130. For example, service provider 160 may determine based on the transaction information whether user 120 is enrolled in a card-linked offer program offered by, or accepted by, financial service account provider 110. Financial service account provider 110 may also verify the transaction based on whether user 120 used the financial service account provided by financial service account provider 110 and/or based on the item or items purchased by user 120 using the financial service account. In one aspect, financial service account provider 110 may be configured to execute software instructions stored in memory 112 via processor 111 to perform verification of the purchase transaction. In another aspect, merchant 130 may be configured to execute software instructions stored in memory 132 via processor 131 to perform verification of the purchase transaction. In another aspect, offer provider 150 may be configured to execute software instructions stored in memory 152 via processor 151 to perform verification of the purchase transaction. In still another aspect, service provider 160 may be configured to execute software instructions stored in memory 162 via processor 161 to perform verification of the purchase transaction.

If the purchase transaction is verified, offer provider 150 may execute software instructions to provide and/or apply a card-linked incentive offer to user 120 (Step 270). In one aspect, offer provider 150 may provide the incentive offer to user 120 to merchant 130 for presentation at the time of the purchase transaction (e.g., at the POS or via a web site that user 120 is accessing to perform a purchase transaction). Offer provider 150 may provide the incentive offer to user 120 via an interface including a prompt that requests a redemption decision by the user. In another embodiment, offer provider 150 may automatically apply the incentive offer to the financial service account of user 120. Alternatively, offer provider 150 may execute software instructions to provide the incentive offer to user 120 at a later time. For example, offer provider 150, via processor 151 and memory 152 may generate and provide an incentive offer to user 120 via network 140 for display on a computing device operated by user 120. Alternatively, offer provider 150 may provide the incentive offer via electronic mail, SMS messaging, mobile device applications, or postal mailings sent to user 120 at a determined address. In other aspects, offer provider 150 may generate and provide the incentive offer to user 120 via another merchant different from the merchant that user 120 interacted with the perform the purchase transaction disclosed above in connection with Step 230. The steps performed above by offer provider 150, processor 151, and memory 152 may alternatively be performed by any or all of financial service account provider 110, via processor 111 and memory 112, merchant 130, via processor 131 and memory 132, and service provider 160, via processor 161 and memory 162. The disclosed embodiments may implement known mechanisms and processes for generating and providing card-linked incentive offers to user 120 consistent with the disclosed embodiments.

Figure 3:
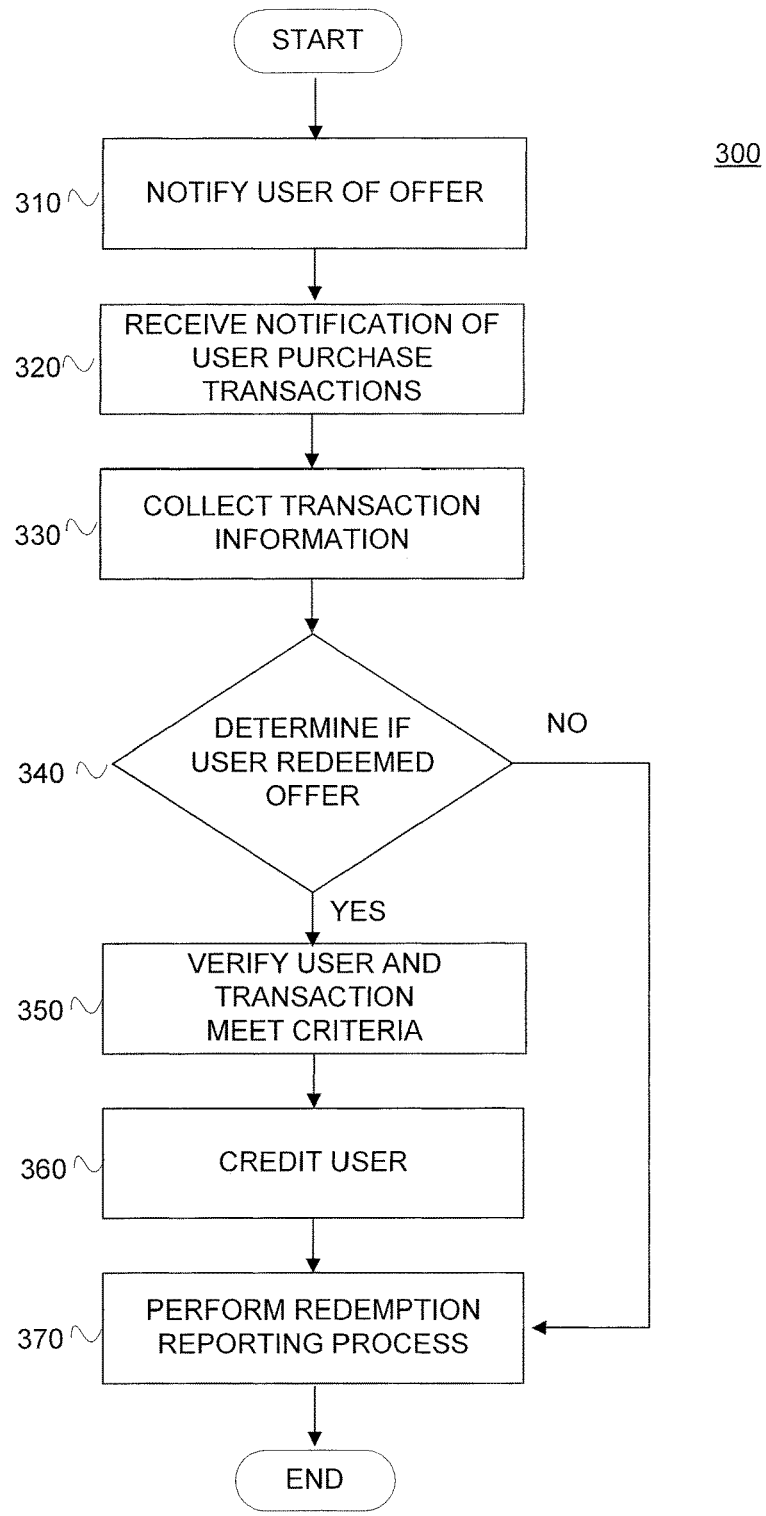
FIG. 3 is a flowchart of an exemplary offer redemption determination process consistent with certain disclosed embodiments.

As disclosed, the disclosed embodiments include aspects that may enable interested entities of system 100 related to card-linked incentive offers that are provided to user 120 to monitor redemptions and the success rate of the incentive offers. FIG. 3 illustrates a flowchart of an exemplary offer redemption determination process, consistent with disclosed embodiments. In certain embodiments, financial service account provider 110, merchant 130, offer provider 150, and/or service provider 160 may execute software instructions to perform the offer redemption determination process of FIG. 3. As an example, FIG. 3 is disclosed in connection with service provider 160 performing the process of FIG. 3.

In one aspect, processor 161 may execute software instructions from memory 162 to generate and provide a card-linked incentive offer to user 120 (Step 310). As discussed above in the context of FIG. 2, the notification may occur concurrently with a purchase transaction performed by user 120, with the result being a card-linked offer presented to the user in near real-time during or just after the transaction. Alternatively, service provider 160 may provide the offer at a time after the purchase transaction is completed by user 120.

User 120 may accept the offer to take part of the card-linked program provided by offer provider 150 and then at some point perform one or more purchase transactions using the financial account from financial service account provider 110 linked to the offer or offers (Step 320). These transactions may occur in various locations in various ways, such as at a point of sale in a brick-and-mortar location of merchant 130, or through network 140 via an Internet Web site associated with merchant 130. For example, Internet transactions may occur on Internet sites owned and operated by merchant 130, or they may occur at intermediate shopping sites such as eBay®, Amazon.com®, or Craigslist®, or on social media such as Facebook®, Pinterest®, or Twitter®.

Service provider 160 may acquire, collect, and store information about the purchase transaction (Step 330). In one aspect, merchant 130 may provide the transaction information to service provider 160 in response to a request by service provider 160 or automatically based on periodic reporting mechanisms. The transaction information may include data about user 120, such as demographic information, value of transaction, types of goods purchased, consumer history with merchant 130 or other merchants, etc. The transaction information may also include information or data about the consumer, merchant, transaction, or financial account. In one aspect, merchant 130 may provide the transaction information to database 170 for storage and access by service provider 160, or alternatively, directly transmit the information to financial service account provider 110, offer provider 150 and/or service provider 160 via network 140. The processes and mechanisms used for collecting transaction information are exemplary and the disclosed embodiments are not limited to the above examples. Financial account provider 110, merchant 130, offer provider 150, service provider 160, network 140, and database 170 may each be configured to collect, store, and monitor transaction information using other types of technologies, methodologies, and processes familiar to those skilled in the art.

Service provider 160, via processor 161 and memory 162, may determine whether user 120 redeems the incentive offer provided in Step 310 (Step 340). In certain embodiments, offer provider 150 (or another entity of system environment 100) may have configured the incentive offer with one or more parameters that require user 120 to redeem the incentive offer within a determined period of time (e.g., at the time of the purchase transaction, within one week of the incentive offer being provided to user 120, etc.), at certain merchants 130, for certain purchase amounts, etc. In another embodiment, the parameters of the incentive offer may change based on where user 120 opts to redeem the offer. For example, the incentive offer may be associated with parameters that change the value of the offer based on where user 120 attempts to redeem the offer (e.g., at a particular merchant 130 or at a particular Internet location accessed via network 140).

If service provider 160 determines that user 120 declined or otherwise did not redeem the incentive offer as set forth by the parameters of the offer (Step 340: NO), the process proceeds to Step 370. If, however, service provider 160 determines that user 120 properly redeemed the offer (Step 340: YES), the process proceeds to Step 350.

After the transaction data is collected, service provider 160, via processor 161 and memory 162, may determine whether the user 120 and the purchase transactions completed in Step 320 meet a set of predetermined criteria for redeeming a card-linked offer (Step 350). Verification may be desired, for example, if the characteristics or terms of the offer may change based on the transaction information of Step 330. Service provider 160 may perform this determination in near real-time during or just after the transaction. Alternatively, service provider 160 may perform the determination at a time after the purchase transaction is completed by user 120.

Service provider 160, via processor 161 and memory 162, may credit user 120 as set out in the parameters of the offer (Step 360). Service provider 160 may present the credit to user 120 as a discount off the instant purchase that user 120 desires to make. The credit may be presented as a discount off a future purchase that user 120 desires to make. The credit may be presented as an additional free item within the user's current purchase, or as a free item not currently within the user's current purchase. The credit may be presented as a discounted item other than an item within the user's current purchase. The credit may be presented as an account credit on the financial service account of user 120 associated with financial account provider 110. The credit may be presented as cash back to user 120 by way of any one of financial account provider 110, merchant 130, offer provider 150, or service provider 160. The credit may occur instantaneously or subsequently.

Service provider 160 may be configured to execute software instructions that perform a redemption reporting process for reporting to interested parties information relating to the redemption of an incentive offer linked to a financial account (Step 370).

Figure 4:
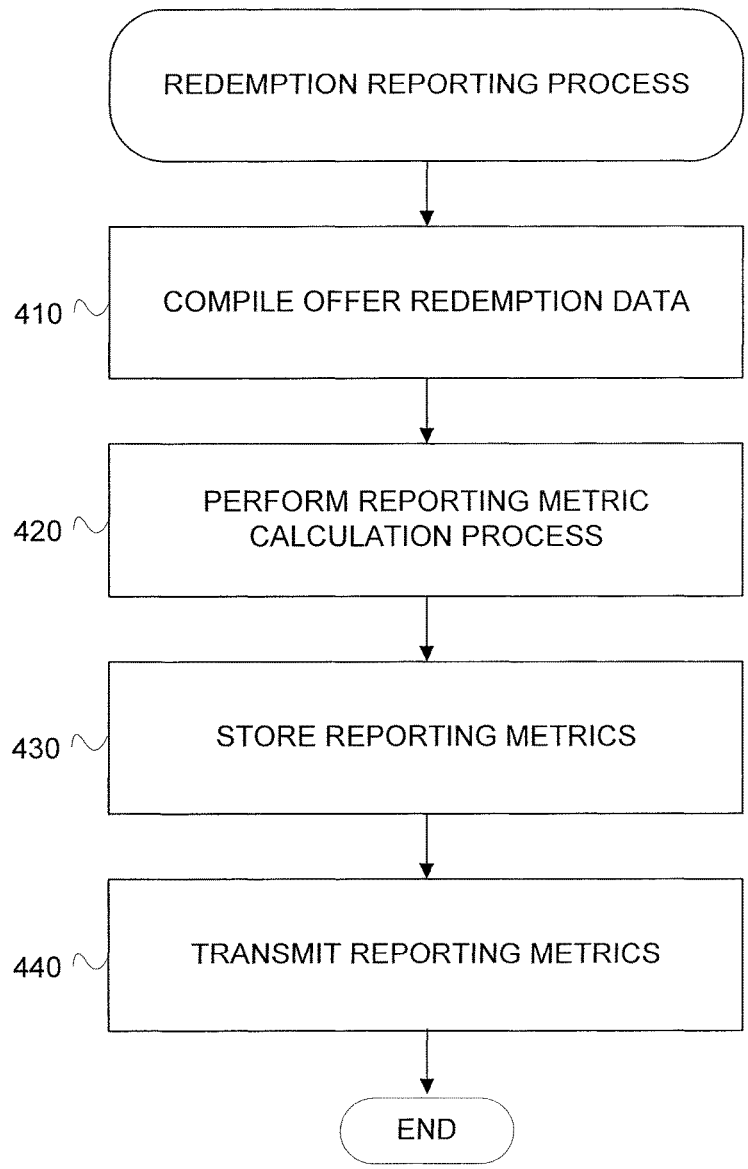
FIG. 4 is a flowchart of an exemplary redemption reporting process consistent with certain disclosed embodiments.

FIG. 4 illustrates a flowchart of an exemplary redemption reporting process 400 consistent with certain disclosed embodiments for reporting to interested parties information relating to the redemption of an incentive offer linked to a financial account. Redemption reporting process 400, as well as any or all of the individual steps therein, may be performed by any one or more of financial account provider 110, merchant 130, offer provider 150, and/or service provider 160. For exemplary purposes, FIG. 4 is disclosed as being performed by service provider 160.

In one embodiment, processor 161 may execute software instructions stored in memory 162 to compile data relating to the redemption of the offer (Step 410). In one aspect, service provider 160 may compile offer redemption data for one or more users 120 on a user basis as relevant purchase transactions are completed, or it may be done at set time intervals, including but not limited to hourly, daily, weekly, monthly, quarterly, yearly, or on a fiscal year basis. In certain embodiments, service provider 160 may collect the offer redemption data from other entities, such as financial service account provider 110, merchant 130, and/or offer provider 150, via respective computing devices operated by those entities. Processor 161 may be configured to receive the offer redemption data over interface components at service provider 160 that connect to network 140. Alternatively, service provider 160 may receive the offer redemption data via other known means of communication, such as postal mail, telephonic means, SMS messaging, or via a mobile application, and provide the data for processing by processor 161. In addition, the offer redemption data may optionally be stored by one or more entities of exemplary system environment 100, either in a memory device configured for that entity, or in database 170.

Based on the compiled offer redemption data, processor 161 may execute software instructions from memory 162 to perform a reporting metric calculation process (Step 420). In one aspect, the reporting metric calculation process may include calculating one or more reporting metrics that provide information about redemption of the card-linked offer to members of system environment 100.

Once calculated, service provider 160 may store the reporting metrics (Step 430). Service provider 160 may store the metrics in memory 162, another memory device local to service provider 160, in database 170, or another memory device.

Service provider 160 may also execute software instructions via processor 161 and memory 162 to report the metrics (Step 440). In one embodiment, service provider 160 may generate a report and transmit the report to one or more entities of system environment 100 via network 140, database 170, or directly via other communication mechanisms. Service provider 160 may provide the metrics to the members of system environment 100 directly, or alternatively may provide them as a component of aggregator portfolios that present the parties with various marketing and advertising options.

Figure 5:
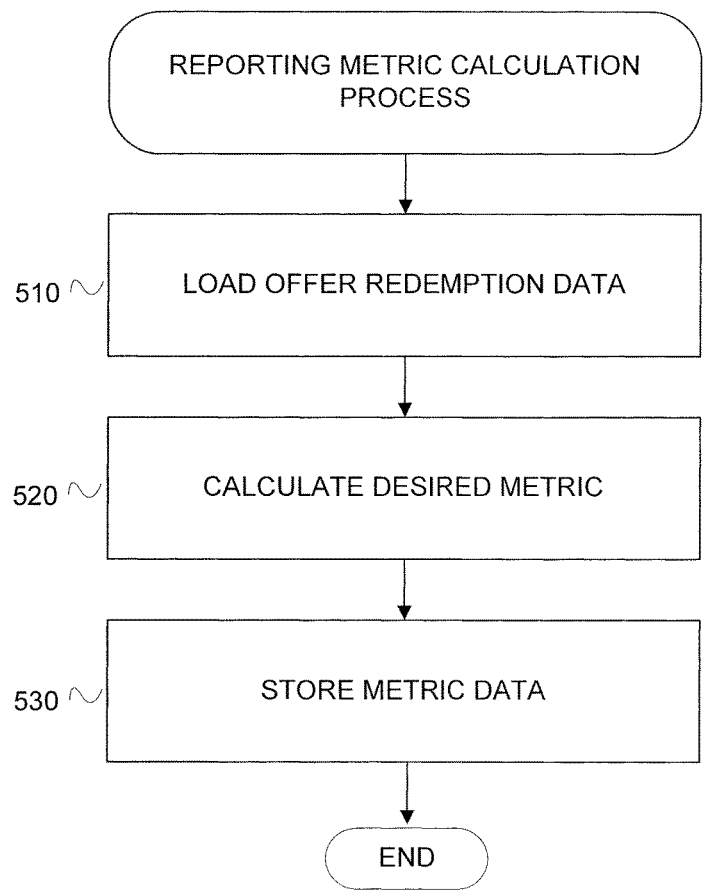
FIG. 5 is a flowchart of an exemplary metric calculation process consistent with certain disclosed embodiments.

FIG. 5 illustrates a flowchart of an exemplary reporting metric calculation process 500 consistent with certain disclosed embodiments. Reporting metric calculation process 500, as well as any or all of the individual steps therein, may be performed by any one or more of financial service account provider 110, merchant 130, offer provider 150, and/or service provider 160. For exemplary purposes, FIG. 5 is disclosed as being performed by service provider 160.

In one embodiment, service provider 160 may perform reporting metric calculation process 500 to calculate a metric consisting of a ratio relating to data collected based on the monitoring of incentive offers linked to a financial account.

For example, processor 161 may execute software instructions to load incentive offer redemption data into memory for processing (Step 510). In one aspect, processor 161 may receive the incentive offer redemption data from another memory location in financial service provider 110 or from another component in system environment 100. Further, processor 161 may be configured to load the offer redemption data on a user-by-user basis as relevant purchase transactions are completed, or it at set time intervals, including but not limited to hourly, daily, weekly, monthly, quarterly, yearly, or on a fiscal year basis.

Processor 161 may execute software instructions from memory 162 to calculate one or more metrics that reflect additional information about the redemption of a card-linked offer (Step 520). In one aspect, the calculated metrics can be used uniformly by entities of system environment 100 (or other financial service entities not shown in FIG. 1) to evaluate the performance of card-linked offers. In another aspect, the metrics can be calculated and presented specifically for various market segments, such as merchant size or merchant type, or demographic information about the associated customers, such as geographic data, income data, behavior or common interest information, age, and so on. In another aspect, the calculation of the metrics may further comprise statistical normalization or other testing to filter out extraneous or potentially confounding variables and highlight more fully the apparent impact of the incentive offer campaign. Where used, the term "product" may include a specific item, a general type of item, all items from a single location of merchant 130, or all items sold by all locations of merchant 130.

In one embodiment, the calculated metric may be a Cost per Pre-Promotion Sales (CPPPS) metric. In one aspect, processor 161 may execute software to calculate a CPPPS metric as:

$$CPPPS = \frac{(d \times r) + f}{(p \times r)},$$

where d represents the user discount, r represents the number of incentive offers redeemed, f represents the total fees paid to service providers, and p represents the total price of the products where offers were redeemed.

In one aspect, merchant 130 may be configured to execute software instructions that perform processes relating to the CPPPS metric. In one aspect, the process may comprise monitoring the cost of selling a given amount of product based on input parameters d, r, f, and p. In another aspect, any member of system environment 100 may perform a calculation similar to that of the CPPPS metric prior to onset of an incentive offer campaign, as a manner of forecasting projected costs.

The user discount may be the specific discount, in terms of currency value, on the purchase transaction associated with the card-linked offer. In certain aspects, if the discount was offered to user 120 as a percentage off the purchase price, service provider 160 may utilize purchase transaction information collected in Step 340 or elsewhere to calculate the currency value of the discount, accounting for local variability in inventory pricing, taxes, and other fees. Service provider 160 may collect user discount information by receiving the information via processor 161 from data stored by financial service account provider 110, merchant 130, or offer provider 150 in their various computer systems, processors, and memory device. Service provider 160 may further collect the information from database 170. Service provider 160 may optionally store the user discount information in memory 162 or other memory devices.

The number of incentive offers redeemed may be a raw count of the number of offers redeemed across all users 120, or members of system environment 100 may report it as a fraction. In some embodiments, it may be a subset of users 120, with service provider 160 or another member of system environment 100 determining the subset properties based on information received via processor 161 or stored in database 170. In one aspect, service provider 160 may collect the number of incentive offers redeemed by receiving the information via processor 161 from data stored by financial service account provider 110, merchant 130, or offer provider 150 in their various computer systems, processors, and memory devices. Service provider 160 may further collect the information from database 170. Service provider 160 may optionally store the number of incentive offers redeemed in memory 162 or other memory devices.

Service provider fees may be fees due to one or both of offer provider 150 or service provider 160, if any. The fees, reported as currency values, may be based on prior agreements. They may be flat fees, or billed on an hourly, daily, weekly, monthly, quarterly, yearly, or on a fiscal year basis. In one aspect, service provider 160 may collect service provider fee information by receiving the information via processor 161 from data stored by financial service account provider 110, merchant 130, or offer provider 150 in their various computer systems, processors, and memory devices. Service provider 160 may further collect the information from database 170. Service provider 160 may optionally store the service provider fee information in memory 162 or other memory devices.

The total price of the products where offers were redeemed may represent the sum paid for all purchased items associated with the card-linked offer by all users 120 that redeemed the offer, or subsets therein. In one aspect, service provider 160 may collect total products price by receiving the information via processor 161 from data stored by financial service account provider 110, merchant 130, or offer provider 150 in their various computer systems, processors, and memory devices. Service provider 160 may further collect the information from database 170. Service provider 160 may optionally store the total price of the products where offers were redeemed in memory 162 or other memory devices. Service provider 160 may alternatively determine the total price of the products where offers were redeemed based on purchase transaction information received in Step 430 by processor 161, from database 170, or from communications received from other members of system environment 100. In one aspect, the total price of the products were offers were redeemed may further include costs of other past, present, or future promotions, sales, and campaigns not associated with the current card-linked offer.

In another embodiment, the calculated metric may be a Cost per Product (CPP) metric. In one aspect, processor 161 may execute software to calculate a CPP metric as:

$$CPP = \frac{(d \times r) + f}{n},$$

where d represents the user discount, r represents the number of incentive offers redeemed, f represents the total fees paid to service providers, and n represents the total number of products purchased in purchase transactions where offers were redeemed.

The user discount, number of incentive offers redeemed, and service provider fees are as described above. The total number of products purchased in purchase transactions where offers were redeemed may represent the sum total count of all purchased items associated with the card-linked offer by all users 120 that redeemed the offer, or subsets therein. In one aspect, service provider 160 may collect the total number of products purchased by receiving the information via processor 161 from data stored by financial service account provider 110, merchant 130, or offer provider 150 in their various computer systems, processors, and memory devices. Service provider 160 may further collect the information from database 170. Service provider 160 may optionally store the total number of products purchased in purchase transactions where offers were redeemed in memory 162 or other memory devices. Service provider 160 may alternatively determine the total number of products purchased where offers were redeemed based on purchase transaction information received in Step 430 by processor 161, from database 170, or from communications received from other members of system environment 100.

In another embodiment, the calculated metric may be a Cost per New Customer (CPNC) metric. In one aspect, processor 161 may execute software to calculate a CPNC metric as:

$$CPNC = \frac{(d \times r) + f}{U_n},$$

where d represents the user discount, r represents the number of incentive offers redeemed, f represents the total fees paid to service providers, and $U_n$ represents the number of consumers who purchased the products associated with the card-linked offer for the first time during a defined time period.

The user discount, number of incentive offers redeemed, and service provider fees are as described above. The number of consumers who purchased the products associated with the card-linked offer for the first time during a defined time period may represent the sum total count of all users 120 who purchased the products associated with the card-linked offer for the first time during the pendency of the card-linked offer campaign, or the defined time period may be shorter or longer than the pendency of the campaign. In one aspect, service provider 160 may collect the number of consumers who purchased the products associated with the card-linked offer for the first time during a defined time period by receiving the information via processor 161 from data stored by financial service account provider 110, merchant 130, or offer provider 150 in their various computer systems, processors, and memory devices. Service provider 160 may further collect the information from database 170. Service provider 160 may optionally store the number of consumers who purchased the products associated with the card-linked offer for the first time during a defined time period in memory 162 or other memory devices. Service provider 160 may alternatively determine the number of consumers who purchased the products associated with the card-linked offer for the first time during a defined time period where offers were redeemed based on purchase transaction information received in Step 430 by processor 161, from database 170, or from communications received from other members of system environment 100.

In another embodiment, the calculated metric may be a Cost per Loyal Customer (CPLC) metric. In one aspect, processor 161 may execute software to calculate a CPLC metric as:

$$CPLC = \frac{(d \times r) + f}{U_l},$$

where d represents the user discount, r represents the number of incentive offers redeemed, f represents the total fees paid to service providers, and $U_l$ represents the number of consumers who purchased the products associated with the card-linked offer more than once during a defined time period.

The user discount, number of incentive offers redeemed, and service provider fees are as described above. The number of consumers who purchased the products associated with the card-linked offer more than once during a defined time period may represent the sum total count of all users 120 who purchased the products associated with the card-linked offer more than once during the pendency of the card-linked offer campaign, or the defined time period may be shorter or longer than the pendency of the campaign. The defined time period may encompass a time period prior to the initiation of the campaign. The products associated with the card-linked offer may include specific items, a general type of item, all items from a single location of merchant 130, or all items sold by all locations of merchant 130. The term "more than once during a defined time period" may encompass making more than one purchase transaction at a single given location of merchant 130's business, or making more than one purchase transaction from merchant 130 as a whole. In one aspect, service provider 160 may collect the number of consumers who purchased the products associated with the card-linked offer more than once during a defined time period by receiving the information via processor 161 from data stored by financial service account provider 110, merchant 130, or offer provider 150 in their various computer systems, processors, and memory devices. Service provider 160 may further collect the information from database 170. Service provider 160 may optionally store the number of consumers who purchased the products associated with the card-linked offer more than once during a defined time period in memory 162 or other memory devices. Service provider 160 may alternatively determine the number of consumers who purchased the products associated with the card-linked offer more than once during a defined time period based on purchase transaction information received in Step 430 by processor 161, from database 170, or from communications received from other members of system environment 100.

In another embodiment, the calculated metric may be a Cost per New Loyal Customer (CPNLC) metric. In one aspect, processor 161 may execute software to calculate a CPNLC metric as:

$$CPNLC = \frac{(d \times r) + f}{U_{nl}},$$

where d represents the user discount, r represents the number of incentive offers redeemed, f represents the total fees paid to service providers, and $U_{nl}$ represents the number of consumers who purchased the products associated with the card-linked offer for the first time and more than once during a defined time period.

The user discount, number of incentive offers redeemed, and service provider fees are as described above. The number of consumers who purchased the products associated with the card-linked offer for the first time and more than once during a defined time period may represent the sum total count of all users 120 who purchased the products associated with the card-linked offer for the first time and more than once during the pendency of the card-linked offer campaign, or the defined time period may be shorter or longer than the pendency of the campaign. The defined time period may encompass a time period prior to the initiation of the campaign. The products associated with the card-linked offer may include specific items, a general type of item, all items from a single location of merchant 130, or all items sold by all locations of merchant 130. Further, in one embodiment, "more than once during a defined time period" may encompass making more than one purchase transaction at a single given location of merchant 130's business, or making more than one purchase transaction from merchant 130 as a whole.

In one aspect, service provider 160 may collect the number of consumers who purchased the products associated with the card-linked offer for the first time and more than once during a defined time period by receiving the information via processor 161 from data stored by financial service account provider 110, merchant 130, or offer provider 150 in their various computer systems, processors, and memory devices. Service provider 160 may further collect the information from database 170. Service provider 160 may optionally store the number of consumers who purchased the products associated with the card-linked offer for the first time and more than once during a defined time period in memory 162 or other memory devices. Service provider 160 may alternatively determine the number of consumers who purchased the products associated with the card-linked offer for the first time and more than once during a defined time period based on purchase transaction information received in Step 430 by processor 161, from database 170, or from communications received from other members of system environment 100.

In another embodiment, the calculated metric may be a Cost per Card Swipe (CPCS) metric. In one aspect, processor 161 may execute software to calculate a CPCS metric as:

$$CPCS = \frac{(d \times r) + f}{U_r},$$

where d represents the user discount, r represents the number of incentive offers redeemed, f represents the total fees paid to service providers, and $U_r$ represents the total number of offers redeemed during a defined time period.

The user discount, number of incentive offers redeemed, and service provider fees are as described above. The number of consumers who redeemed the offer during a defined time period may represent the sum total count of all users 120 who redeemed the offer during the pendency of the card-linked offer campaign, or the defined time period may be shorter or longer than the pendency of the campaign. In one aspect, service provider 160 may collect the number of consumers who redeemed the offer during a defined time period by receiving the information via processor 161 from data stored by financial service account provider 110, merchant 130, or offer provider 150 in their various computer systems, processors, and memory devices. Service provider 160 may further collect the information from database 170. Service provider 160 may optionally store the number of consumers who redeemed the offer during a defined time period in memory 162 or other memory devices. Service provider 160 may alternatively determine the number of consumers who redeemed the offer during a defined time period based on purchase transaction information received in Step 430 by processor 161, from database 170, or from communications received from other members of system environment 100.

It is understood that the metrics disclosed above are exemplary and are not limiting to the disclosed embodiments. The disclosed embodiments may generate, use, and/or implement other metrics based on the compiled offer redemption data.

Service provider 160 may store any or all of the metrics in memory 162 or in database 170 (Step 530). Once stored, service provider 160 may provide the metrics to other members of system environment 100 or to parties outside of system environment 100 for a variety of purposes, with non-limiting examples described below. The metrics may also be provided by any or all of financial service account provider 110, merchant 130, or offer provider 150. The metrics may be provided gratis, or the entity providing the metrics may charge a fee for the service.

In one aspect, one or more entities of system environment 100 (e.g., financial service provider 110, merchant 130, offer provider 150, and/or service provider 160) may form agreements that provide for the sharing of revenue associated with the card-linked offers associated with the disclosed embodiments. The agreements may enable one or more of the entities to share a percentage or portion of the revenue obtained when a card-linked offer is redeemed. In one aspect, participating entities may maintain in their respective systems (e.g., processors, memory devices ,etc.) information reflecting agreed deals regarding the revenue sharing. Aspects of the disclosed embodiments execute software instructions via a processor that determines whether revenue sharing may be modified based on a performance of the card-linked offers. For example, financial service provider 110 may execute software that tracks the performance of card-linked offers based on reporting metric data. Based on whether the metric data shows that the performance of the card-linked offers meets determined conditions, financial service provider 110 may adjust the amount of revenue that may be shared with another entity. For example, when financial service provider 110 (in this example) determines via the reporting metric data that an offer performed better than expected (e.g., met or exceeds a forecast goal), it may adjust the percentage of revenue shared with participating partners for the offer. Similarly, if the performance of the offer did not meet expectations (e.g., a goal), financial service provider 110 (in this example) may reduce the percentage of revenue shared with the participating partners. Financial service provider 110 (in this example) may generate and send a message or notification to the participating partner(s) informing it of any adjustments to the revenue sharing aspects of the card-linked offer process consistent with the disclosed embodiments.

Figure 6:
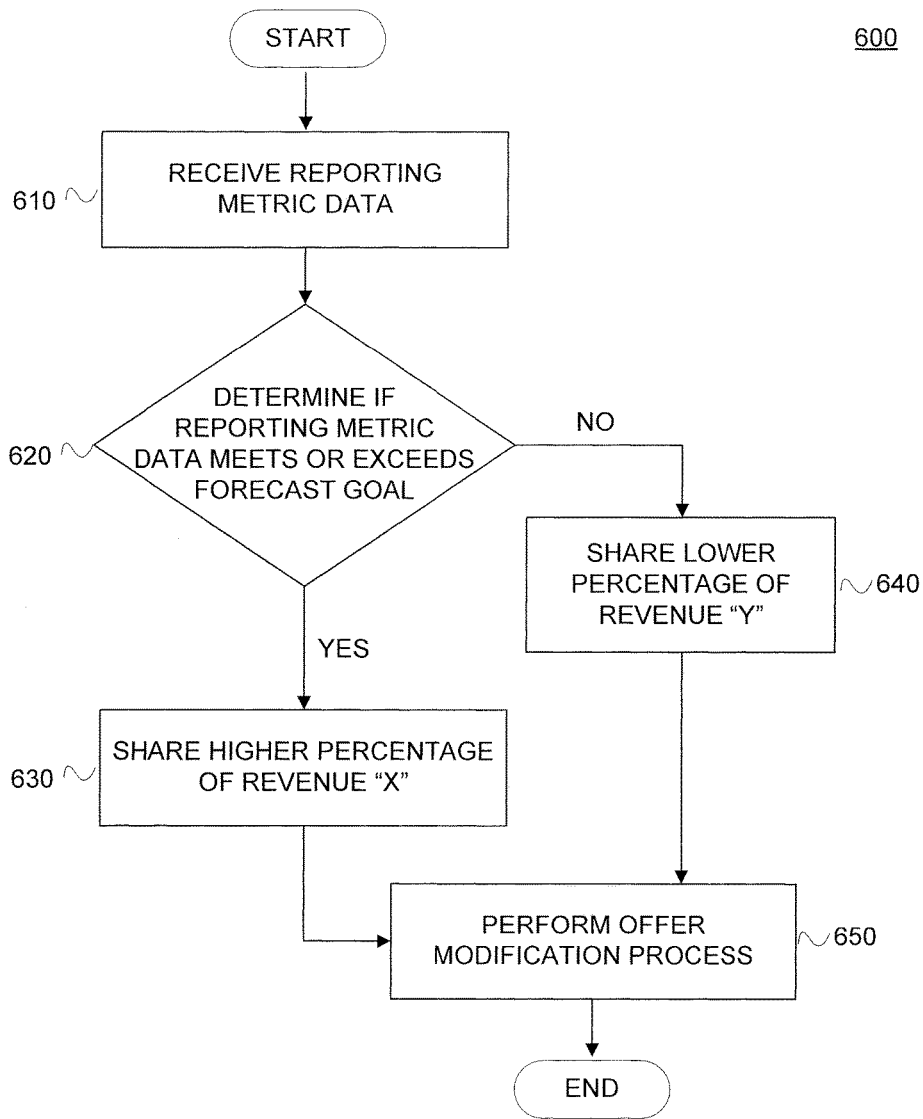
FIG. 6 is a flowchart of an exemplary method for sharing revenue derived from redemptions of an offer related to a customer's financial account, consistent with disclosed embodiments.

FIG. 6 illustrates an exemplary process for sharing revenue derived from redemptions of an offer related to a customer's financial account, consistent with the disclosed embodiments. In one aspect, one or more components of system environment 100, for example, service provider 160 via processor 161, may transmit reporting metric data (for example, metrics such as those calculated in metric calculation process 500). A device associated with financial account provider 110, merchant 130, offer provider 150, or service provider 160, or another entity not shown in system 100, may receive the reporting metric data (Step 610).

In one aspect, the receiving device may execute software instructions via a processor to determine whether the received reporting metric meets or exceeds at least one predetermined condition, such as a forecast goal (Step 620). In one aspect, a forecast goal may reflect a goal determined by the entity (or provided to that entity) associated with the receiving device. A forecast goal may be, for example, a merchant paying no more than $20 per new customer (CPNC) while acquiring at least 10,000 new customers during the entire campaign, or a merchant having 5,000 loyal customers redeem an offer (CPLC) from a campaign. In one example, the receiving device may compare the received reporting metric data, via a processor, to the at least one predetermined condition. In one embodiment, if the received reporting metric data meets or exceeds the predetermined condition (Step 620; YES), then a higher percentage of the overall revenue realized as part of the offer may be shared with another entity, such as participating partners of a revenue sharing process, including but not limited to financial account provider 110, merchant 130, offer provider 150, or service provider 160 (Step 630).

In another embodiment, if the received reporting metric data does not meet or exceed the at least one predetermined condition (Step 620; NO), then a lower percentage of the overall revenue realized as part of the offer may be shared with the other entities, including but not limited to financial account provider 110, merchant 130, offer provider 150, or service provider 160 (Step 640). In another embodiment, there may be no revenue shared at all.

In response to the comparison between the reporting metric data and the predetermined condition in Step 620, the offer may be modified and prepared for re-presentation by any one or more of financial account provider 110, merchant 130, offer provider 150, or service provider 160 (Step 650). An example of an offer modification process is disclosed below in connection with FIG. 7.

Figure 7:
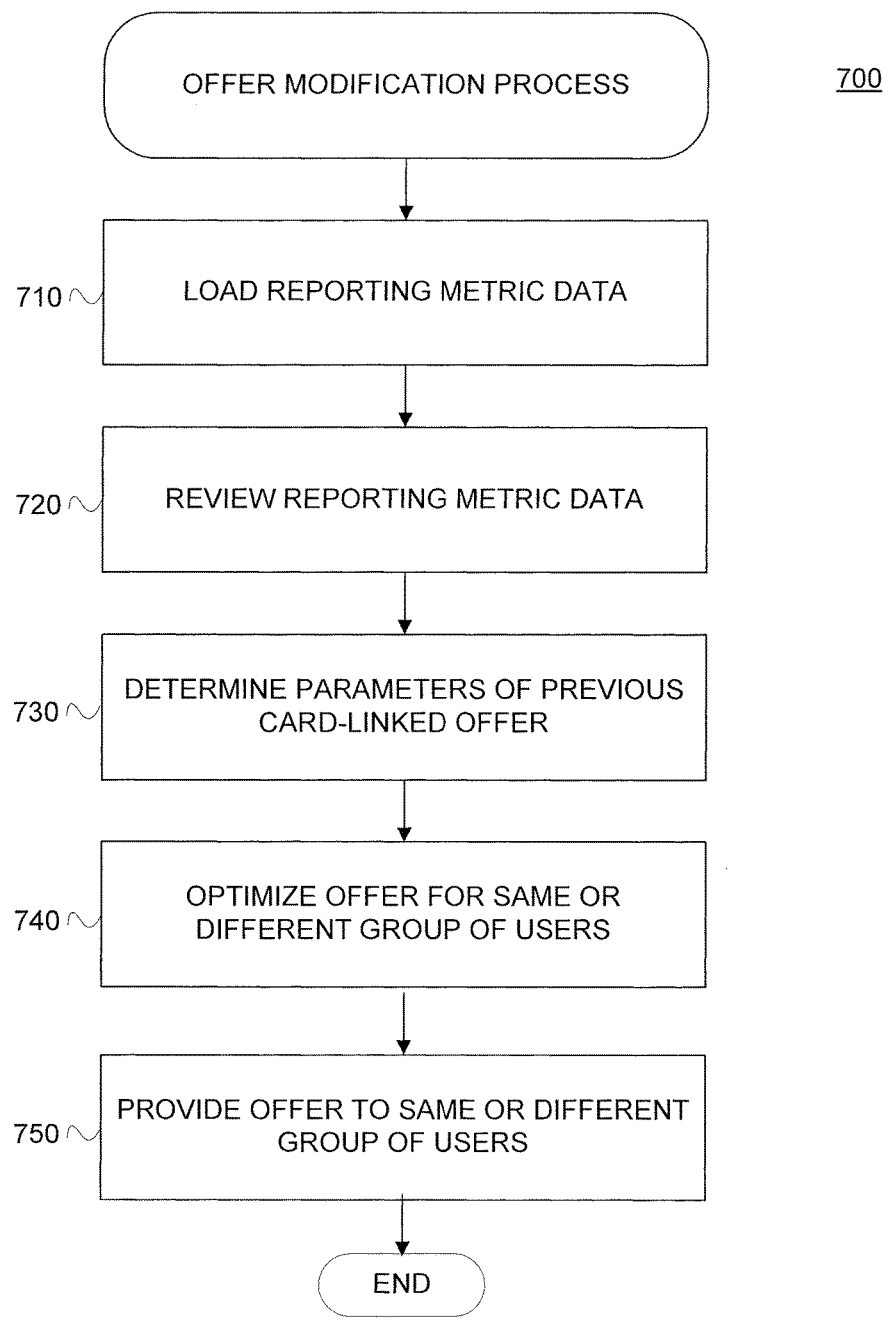
FIG. 7 is a flowchart of an exemplary method for modifying an offer in response to incentive offer reporting metrics, consistent with disclosed embodiments.

FIG. 7 illustrates a flowchart of an exemplary offer modification process, consistent with disclosed embodiments. In certain embodiments, financial service account provider 110, merchant 130, offer provider 150, and/or service provider 160 may execute software instructions to perform offer modification process 700. As an example, FIG. 7 is disclosed in connection with offer provider 150 performing offer modification process 700.

Offer provider 150 may load reporting metric data via processor 151 executing instructions via processor 152 (Step 710). Offer provider 150 may review the loaded reporting metric data (Step 720), determine the parameters of the previous offer (Step 730), and optimize the offer for the same group of users 120 or a different group of users 120 (Step 740).

In one embodiment, offer provider 150 may modify the card-linked offer by presenting it to a different demographic group constituting one or more users 120. Processor 151 may execute software instructions from memory 152 to review the card-linked offer redemption metrics, determine the demographic groups previously targeted in the offer, and optimize the offer for the same or different groups of users 120.

In another embodiment, offer provider 150 may modify the card-linked offer by presenting it to a different number of users 120. Processor 151 may execute software instructions from memory 152 to review the card-linked offer redemption metrics, determine the number of users 120 previously targeted in the offer, and optimize the offer for a greater or lesser number of users 120.

In yet another embodiment, offer provider 150 may modify the card-linked offer by altering the reward or incentive presented to user 120 as part of the offer. Processor 151 may execute software instructions from memory 152 to review the card-linked offer redemption metrics, determine the incentive offered to various users 120, and optimize the offer for the same or different groups of users 120.

After modifying the offer, offer provider 150 may provide the offer to the new set of users 120 (Step 750), thus commencing process 300 anew.

Figure 8:
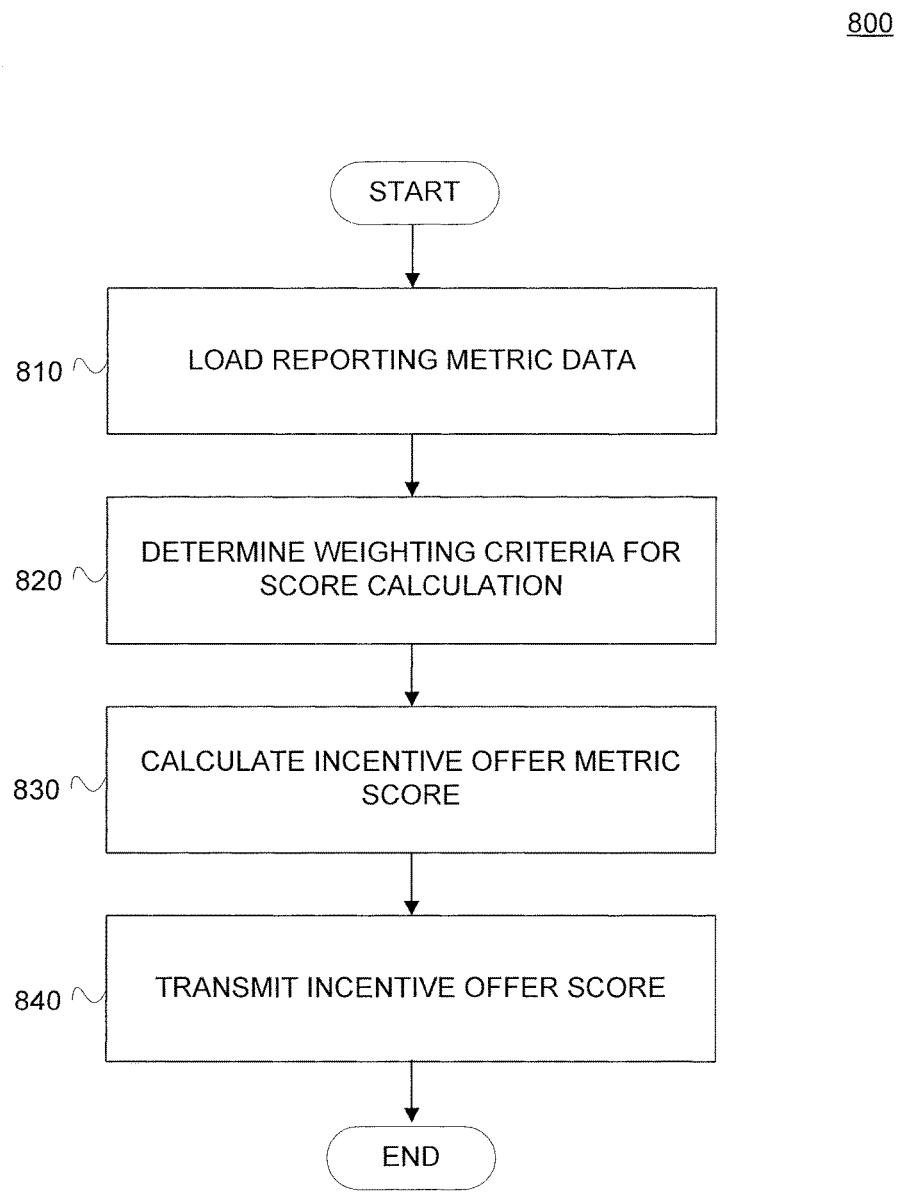
FIG. 8 is a flowchart of an exemplary incentive offer metric score calculation process consistent with certain disclosed embodiments.

Components of system environment 100 may use the metrics to create reports and summarize the metrics to communicate performance of the card-linked offer. FIG. 8 illustrates an exemplary process for determining an incentive offer metric score, consistent with disclosed embodiments. In certain embodiments, financial service account provider 110, merchant 130, offer provider 150, and/or service provider 160 may execute software instructions to perform incentive offer metric score calculation process 800. As an example, FIG. 8 is disclosed in connection with service provider 160 performing incentive offer metric score calculation process 800.

Service provider 160 may load and import reporting metric data via processor 161 (Step 810). Processor 161 may load the reporting metric data from memory 162, or from database 170 or memory devices associated with financial service account provider 110, merchant 130, or offer provider 150 via network 140. Processor 161 may load any or all of the reporting metrics calculated in reporting metric calculation process 500. The loaded data may be stored in memory 162 or in database 170.

Service provider 160, via processor 161, may determine the weighting criteria for an incentive offer metric score (Step 820). Based on the information desired, various reporting metrics may be weighted more than other metrics. For example, offer provider 150 may determine a total evaluation of how the card-linked offer performed with respect to new customers. Service provider 160 may receive predetermined criteria from offer provider 150 of which metrics to use to calculate an incentive offer metric score, and how to weight the individual metrics within a score calculation algorithm. In the above example, the Cost Per New Customer (CPNC) and Cost Per New Loyal Customer (CPNLC) reporting metrics might be emphasized, along with other reporting metrics that could be contemplated by those skilled in the art.

Processor 161 may execute instructions stored in memory 162 to calculate an incentive offer metric score (Step 830).

In one aspect, the incentive offer metric score may be calculated as a weighted ratio. Using the "new customer" sample above as an example, an incentive offer metric score may be calculated as:

$$Score=CPNC(x)+CPNLC(y)$$

wherein x and y are weighted fractions determined beforehand for each of the relevant offer reporting metrics.

In another aspect, multiple ratios may be included with different weights depending on the information desired by a client. Again using the "new customer"example above, an incentive offer metric score may be calculated as:

$$Score=CPNC(a)+CPNLC(b)+CPCS(c)+CPLC(d)+CPP(e)$$

where CPNC and CPNLC are described above, CPCS is a Cost Per Card Swipe metric as described above, CPLC is a Cost Per Loyal Customer Metric as described above, CPP is a Cost per Product metric as described above, and a-e are weighted fractions determined beforehand for each of the relevant offer reporting metrics.

The incentive offer metric score calculation may aggregate data and metrics associated with card-linked offers from one or more financial service account providers 110, merchants 130, offer providers 150, or service providers 160. The incentive offer metric score calculation may aggregate or compare data across multiple financial service account providers 110, merchants 130, offer providers 150, or service providers 160. Additionally, the incentive offer metric score calculation may aggregate or compare data from multiple types of incentive offers, including but not limited to card-linked offers, free-standing inserts, coupons, free items, and add-on items.

It is understood that the aforementioned metric scores are not limiting. Those skilled in the art will recognize other metric scores that can be determined by the disclosed embodiments based on the compiled offer redemption data and metrics.

Processor 161 may execute instructions stored in memory 162 to provide an incentive offer metric score to other parties (Step 840). Service provider 160, via processor 161, may transmit the incentive offer score or scores via network 140 to other members of system environment 100, or may transmit the score or scores via network 140 to other parties outside of system environment 100. Service provider 160 may provide the scores gratis or may charge a fee for providing the incentive offer metric score or scores. The fee, if any, may be a one-time fee or may be a subscription fee charged regularly at a determined time interval, such as daily, weekly, monthly, quarterly, yearly, or by fiscal year. Service provider 160 may provide the incentive offer score or scores to the members of system environment 100 directly, or alternatively may provide them as a component of aggregator portfolios that present the parties with various marketing and advertising options.

Other features and functionalities will be apparent to those skilled in the art from consideration of the specification and practice of the disclosed embodiments. For example, the processes of FIGS. 2-8 are not limited to the sequences described above. Variations of these sequences, such as the removal and/or the addition of other process steps may be implemented without departing from the spirit and scope of the disclosed embodiments.

Additionally, the disclosed embodiments may be applied to different types of financial accounts. Any financial institution that provides financial service accounts to customers may employ systems, methods, and articles of manufacture consistent with certain principles related to the disclosed embodiments. In addition, any merchant, retailer, or corporate entity that provides loyalty programs, incentive programs, discounts, and/or advertisements to customers or potential customers may also employ systems, methods, and articles of manufacture consistent with certain disclosed embodiments.

In certain aspects, the metrics determined by the disclosed embodiments may be used for various reasons. For example, metrics may be used for revenue sharing, as disclosed above. In another aspect, service providers, such as service provider 160, may execute software that performs processes that use the metrics to promote their business and/or solicit business relating to management of incentive offer campaigns from other parties, such as financial service account provider 110, merchant 130, or offer provider 150. In another aspect, merchants such as merchant 130 may use the metrics to compare the performance of card-linked offers to other marketing campaigns that are not linked to card-linked offers. Merchant 130 may execute software that performs processes that utilize the metrics to determine the impact of marketing efforts in general. In another aspect, financial service account providers such as financial service account provider 110 may execute software that performs processes that use the metrics to promote their business and/or solicit business relating to management of incentive offer campaigns from other parties, such as merchant 130, offer provider 150, or service provider 160. Financial service account provider 110 may further execute software that performs processes that utilize the metrics to compare the performance of various partners over various incentive offer campaigns that it employs to manage and monitor the campaigns, such as offer provider 150 or service provider 160.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system comprising:
an offer provider system comprising a first memory storing first instructions and a first processor configured to execute the first instructions to:
send an original incentive offer as a notification to a mobile device operated by a first consumer belonging to a first demographic group for display;
receive first transaction information from a merchant device when the first consumer accepts the original incentive offer;
send the first transaction information to a service provider system;
receive a first plurality of incentive offer metrics from the service provider system based on the first transaction information;
modify the original incentive offer for a second demographic group different from the first demographic group based on the first plurality of incentive offer metrics, wherein at least one parameter of the modified incentive offer is altered as compared to the original incentive offer;

send the modified incentive offer as a notification to a mobile device operated by a second consumer belonging to a second demographic group for display;

receive second transaction information from the merchant device when the second consumer accepts the modified incentive offer;

send the second transaction information to the service provider system; and receive a second plurality of incentive offer metrics from the service provider system based on the second transaction information; and the service provider system comprising a second memory storing second instructions and a second processor configured to execute the second instructions to:

compare the first plurality of incentive offer metrics associated with the original incentive offer and the second plurality of incentive offer metrics associated with the modified incentive offer to a predetermined condition; and modify an amount of revenue shared with other entities based on the comparison.

2. The system of claim 1, wherein the second processor is further configured to execute the second instructions to:

calculate a first incentive offer metric score based on the first plurality of incentive offer metrics; and generate report data reflecting an assessment of the performance of the original incentive offer based on the first incentive offer metric score.

3. The system of claim 1, wherein:

the second processor is further configured to execute the second instructions to calculate at least one of the first plurality of incentive offer metrics or the second plurality of incentive offer metrics; and calculating at least one of the first plurality of incentive offer metrics or the second plurality of incentive offer metrics comprises calculating a cost per card swipe metric based on customer discount, a number of at least one of original incentive offers or modified incentive offers redeemed, total fees paid to service providers, and a total number of at least one of original incentive offers or modified incentive offers redeemed during a defined time period.

4. The system of claim 1, wherein:

the second processor is further configured to execute the second instructions to calculate at least one of the first plurality of incentive offer metrics or the second plurality of incentive offer metrics; and calculating at least one of the first plurality of incentive offer metrics or the second plurality of incentive offer metrics comprises calculating a cost per pre-promotion sales metric based on customer discount, a number of at least one of original incentive offers or modified incentive offers redeemed, total fees paid to service providers, and a total price of products where at least one of original incentive offers or modified incentive offers were redeemed.

5. The system of claim 1, wherein:

the second processor is further configured to execute the second instructions to calculate at least one of the first plurality of incentive offer metrics or the second plurality of incentive offer metrics; and calculating at least one of the first plurality of incentive offer metrics or the second plurality of incentive offer metrics comprises calculating a cost per product metric based on the ratio customer discount, a number of at least one of original incentive offers or modified incentive offers redeemed, total fees paid to service providers, and a total number of products where at least one of original incentive offers or modified incentive offers were redeemed.

6. The system of claim 1, wherein:

the second processor is further configured to execute the second instructions to calculate at least one of the first plurality of incentive offer metrics or the second plurality of incentive offer metrics; and calculating at least one of the first plurality of incentive offer metrics or the second plurality of incentive offer metrics comprises calculating a cost per new customer metric based on customer discount, a number of at least one of original incentive offers or modified incentive offers redeemed, total fees paid to service providers, and a number of consumers who purchased products for the first time where at least one of original incentive offers or modified incentive offers were redeemed.

7. The system of claim 1, wherein:

the second processor is further configured to execute the second instructions to calculate at least one of the first plurality of incentive offer metrics or the second plurality of incentive offer metrics; and calculating at least one of the first plurality of incentive offer metrics or the second plurality of incentive offer metrics comprises calculating a cost per loyal customer metric based on customer discount, a number of at least one of original incentive offers or modified incentive offers redeemed, total fees paid to service providers, and a number of consumers who purchased the products where at least one of original incentive offers or modified incentive offers were redeemed more than once during a defined time period.

8. The system of claim 1, wherein:

the second processor is further configured to execute the second instructions to calculate at least one of the first plurality of incentive offer metrics or the second plurality of incentive offer metrics; and calculating at least one of the first plurality of incentive offer metrics or the second plurality of incentive offer metrics comprises calculating a cost per new loyal customer metric based on customer discount, a number of at least one of original incentive offers or modified incentive offers redeemed, total fees paid to service providers, and a number of consumers who purchased the products associated with at least one of original incentive offers or modified incentive offers for the first time and more than once during a defined time period.

9. The system of claim 1, wherein:

the second processor is further configured to execute the second instructions to calculate at least one of the first plurality of incentive offer metrics or the second plurality of incentive offer metrics; and calculating at least one of the first plurality of incentive offer metrics or the second plurality of incentive offer metrics comprises:

calculating a cost per new customer metric based on based on customer discount, a number of at least one of original incentive offers or modified incentive offers redeemed, total fees paid to service providers, and a number of consumers who purchased products for the first time where at least one of original incentive offers or modified incentive offers were redeemed;

calculating a cost per new loyal customer metric based on the customer discount, a number of at least one of original incentive offers or modified incentive offers redeemed, total fees paid to service providers, and a number of consumers who purchased the products associated with at least one of original incentive offers or modified incentive offers for the first time and more than once during a defined time period;

calculating a first incentive offer metric score based on the first plurality of incentive offer metrics calculated; and calculating a second incentive offer metric score based on the second plurality of incentive offer metrics calculated, wherein calculating at least one of the first incentive offer metric score or the second incentive offer metric score comprises weighting the cost per new customer metric, weighting the cost per new loyal customer metric, and aggregating the weighted cost per new customer metric and the weighted cost per new loyal customer metric.

10. The system of claim 1, wherein:

the second processor is further configured to execute the second instructions to calculate at least one of the first plurality of incentive offer metrics or the second plurality of incentive offer metrics; and calculating at least one of the first plurality of incentive offer metrics or the second plurality of incentive offer metrics comprises:

calculating a cost per new customer metric based on customer discount, a number of at least one of original incentive offers or modified incentive offers redeemed, total fees paid to service providers, and a number of consumers who purchased products for the first time where at least one of original incentive offers or modified incentive offers were redeemed;

calculating a cost per new loyal customer metric based on the customer discount, a number of at least one of original incentive offers or modified incentive offers redeemed, total fees paid to service providers, and a number of consumers who purchased the products associated with at least one of original incentive offers or modified incentive offers for the first time and more than once during a defined time period;

calculating a cost per card swipe metric based on the customer discount, a number of at least one of original incentive offers or modified incentive offers redeemed, total fees paid to service providers, and a total number of at least one of original incentive offers or modified incentive offers redeemed during a defined time period;

calculating a cost per loyal customer metric based on based on the customer discount, a number of at least one of original incentive offers or modified incentive offers redeemed, total fees paid to service providers, and a number of consumers who purchased the products where at least one of original incentive offers or modified incentive offers were redeemed more than once during a defined time period;

calculating a cost per product metric based on the customer discount, a number of at least one of original incentive offers or modified incentive offers redeemed, total fees paid to service providers, and a total number of products where at least one of original incentive offers or modified incentive offers were redeemed;

calculating a first incentive offer metric score based on the first plurality of incentive offer metrics calculated; and calculating a second incentive offer metric score based on the second plurality of incentive offer metrics calculated, wherein calculating at least one of the first incentive offer metric score or the second incentive offer metric score comprises weighting and aggregating the cost per new customer metric, the cost per new loyal customer metric, the cost per card swipe metric, the cost per loyal customer metric, and the cost per product metric.

11. The system of claim 10, wherein the cost per new customer metric, the cost per new loyal customer metric, the cost per card swipe metric, the cost per loyal customer metric, and the cost per product metric are weighted differently.

12. The system of claim 1, wherein the second processor is further configured to execute the second instructions to calculate at least one of the first plurality of incentive offer metrics or the second plurality of incentive offer metrics based on customer demographic information selected from the group consisting of geographic data, income data, behavior, common interest information, and age.

13. The system of claim 1, wherein the second processor is further configured to execute the second instructions to calculate at least one of the first plurality of incentive offer metrics or the second plurality of incentive offer metrics based on market segment information selected from the group consisting of merchant size and merchant type.

14. The system of claim 1, wherein:

the second processor is further configured to execute the second instructions to calculate at least one of the first plurality of incentive offer metrics or the second plurality of incentive offer metrics; and calculating at least one of the first plurality of incentive offer metrics or the second plurality of incentive offer metrics further comprises filtering out confounding variables.

15. The system of claim 1, wherein modifying the amount of revenue shared with other entities based on the comparison comprises increasing an amount of revenue shared with the other entities for at least one of the original incentive offer or the modified incentive offer when at least one of the first plurality of incentive offer metrics or the second plurality of incentive offer metrics calculated exceeds the predetermined condition.

16. The system of claim 1, wherein modifying the amount of revenue shared with other entities based on the comparison comprises reducing an amount of revenue shared with the other entities for at least one of the original incentive offer or the modified incentive offer when at least one of the first plurality of incentive offer metrics or the second plurality of incentive offer metrics calculated incentive offer metrics is less than the predetermined condition.

17. The system of claim 15, wherein the second processor is further configured to execute the second instructions to notify the other entities of the revenue increase.

18. The system of claim 16, wherein the second processor is further configured to execute the second instructions to notify the other entities of the revenue reduction.

19. The system of claim 1, wherein at least one of the notification for the original incentive offer or the notification for the modified incentive offer is sent as an SMS message or a mobile application notification.

20. The system of claim 1, wherein the second processor is further configured to execute the second instructions to:

calculate a first incentive offer metric score based on the first plurality of incentive offer metrics calculated, wherein calculating the first incentive offer metric score comprises weighting each of the first plurality of incentive offer metrics, and aggregating the weighted first plurality of incentive offer metrics; and calculate a second incentive offer metric score based on the second plurality of incentive offer metrics calculated, wherein calculating the second incentive offer metric score comprises weighting each of the second plurality of incentive offer metrics, and aggregating the weighted second plurality of incentive offer metrics.

* * * * *